United States Patent [19]

Nishiyama et al.

[11] 4,273,825
[45] Jun. 16, 1981

[54] ELECTRIC INSULATING SHEET

[75] Inventors: Ryota Nishiyama; Takashi Koike; Shunji Seino, all of Tokyo, Japan

[73] Assignee: Mitsubishi Paper Mills, Ltd., Tokyo, Japan

[21] Appl. No.: 60,633

[22] Filed: Jul. 23, 1979

[30] Foreign Application Priority Data

Jul. 27, 1978 [JP] Japan .................. 53/91889

[51] Int. Cl.³ .................. B32B 5/16
[52] U.S. Cl. .................. 428/223; 156/62.8; 156/307.1; 156/308.2; 162/125; 162/129; 162/138; 162/145; 162/146; 162/181 C; 162/181 R; 428/240; 428/247; 428/251; 428/284; 428/285; 428/287; 428/294; 428/292; 428/302; 428/324; 428/402; 428/901

[58] Field of Search .............. 162/125, 129, 145, 146, 162/138, 181 C, 181 R; 428/245, 255, 284, 286, 297, 296, 298, 302, 324, 402, 283, 240, 247, 251, 285, 294, 901; 156/306, 62.8, 307.1, 308.2

[56] References Cited

U.S. PATENT DOCUMENTS 3,523,061 8/1970 Purvis .................. 162/138

*Primary Examiner*—James J. Bell
*Attorney, Agent, or Firm*—Cushman, Darby & Cushman

[57] ABSTRACT

A laminated composite comprising a web of heat-resistant base material having a sufficient structural strength and a web of tiny mica flakes laid on said web of base material by multilayer-paper making. This composite can be manufactured with good operational efficiency, is improved in mica retention and is excellent in varnish-impregnability, heat-resistance, mechanical strengths and electric insulation.

4 Claims, 1 Drawing Figure

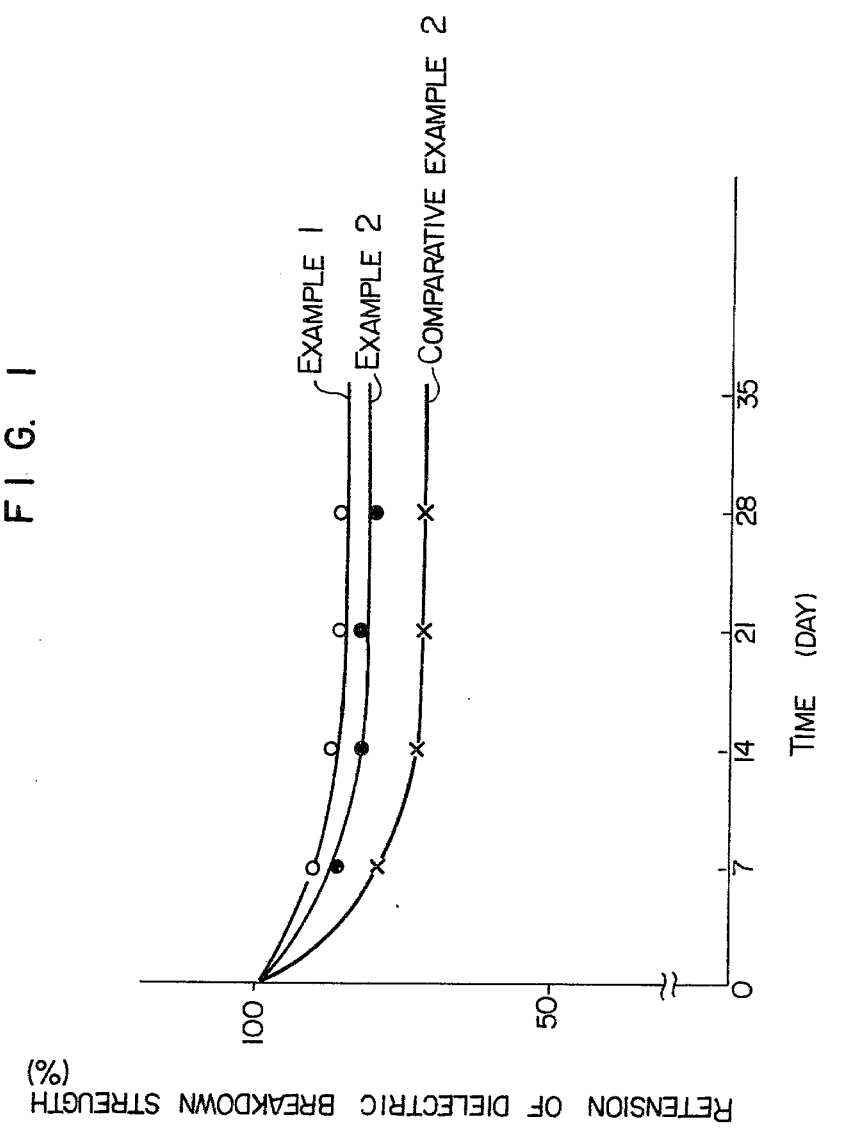

ELECTRIC INSULATING SHEET

This invention relates to an electric insulating sheet. More particularly, it relates to a wet-formed reinforced sheet of tiny-mica flakes.

The wet-formed non-woven sheet of tiny mica (hereinafter referred to simply as mica paper) is excellent in heat resistance and electric insulating property and is widely used for these reasons. Since such mica papers are made from tiny mica flakes without using binders, they are of low strength and the tiny flakes of mica easily drop off, requiring the greatest possible care for their handling. The manufacture of such mica papers also presents difficulties such as break, sticking of mica flakes to press rolls, fouling of felt, and decreased sheet-making efficiency. In particular, a light weight mica paper is less in strength and the wet sheet formation becomes more difficult. In using such a low-strength mica paper as electric insulation material, it is necessary to reinforce the structural strength by backing the mica paper with an insulating base material using a varnish or an adhesive.

Recently, pulp-like particles of certain synthetic polymers obtained by introducing a polymer solution into a precipitant medium under application of a shearing force to precipitate the polymer has attracted attention, because of favorable heat resistance and electric characteristics. For example, Japanese Patent Publication No. 20,421/68 has disclosed "a composite in sheet form suitable for electric insulation, which is characterized by containing at least one compressed and consolidated water leaf comprising an entangled mixture of 10 to 90% by weight of tiny mica flakes and 90 to 10% by weight of substantially unmolten aromatic polyamide fibrids."

However, when examined from the standpoint of general purpose electric insulating material, such material is still insufficient in its overall characteristics with respect to electric insulation, varnish-impregnability and resistance to mica-peeling off. The composite as described in Japanese Patent Publication No. 20,421/68 is a mixture of mica and an aromatic polyamide. If the ratio of mica is increased, processing of the material becomes difficult on account of marked decrease in structural strength, whereas if the ratio of aromatic polyamide is increased, varnish-impregnability becomes difficult and, accordingly, insulation properties are deteriorated. In the intermediate range of mica-to-polyamide ratios, the composite is insufficient in overall properties.

An object of this invention is to provide an electric insulation sheet comprising a reinforced mica paper of a dual structure composed of a base material and a mica paper layer without an adhesive.

Another object of this invention is to provide a method for manufacturing an electric insulating sheet having a good processability.

According to this invention, there is provided an electric insulating sheet comprising a two-layer composite composed of a web of heat-resistant base material having a sufficient structural strength and a web of tiny mica flakes which may contain up to 9% of pulp like particles of a heat-resistant polymer and which is overlaid on and integrated with said web of base material.

The insulating sheet of this invention is obtained by means of a paper-making unit capable of forming two or more wet webs such as, for example, a unit of two or more wet web forming cylinders arranged in series. In such a unit, a wet web of heat-resistant base material and a wet web of mica flakes containing none or up to 9% of a heat-resistant polymer are separately formed and while maintaining the water content of the base material web above 60%, both wet webs are laid one over the other to form a wet double layer which is then consolidated or integrated by drying.

The mica layer according to this invention is composed of mica alone or preferably contains up to 9% of a heat-resistant polymer such as an aromatic polyamide polyamide-imide, polyimide, aromatic polyester or polyethylene terephthalate. A suitable form of these polymers is pulp-like particles, though powdered polymers can also be employed. The pulp-like particles are manufactured by known methods such as, for example, that disclosed in Japanese Patent Publication No. 5,732/62. According to the disclosure, a polymer solution is introduced into a precipitant medium while applying a shearing force to obtain a pulp-like material having a form of pulp or ribbon. By admixing the tiny mica flakes with a small quantity of such a pulp-like material, the bond strength between mica particles is markedly reinforced, the adhesion of mica layer to the heat-resistant base material is also improved, and the detachableness of mica by friction is suppressed. A heat-resistant polymer in powder form as such is insufficient in mica retentive ability which can however be improved by softening or melting on heating the finished product. The proportion of a heat-resistant polymer in the mica layer is preferably below 9%. If it exceeds 9%, the electric characteristics of mica layer, particularly the corona characteristics are deteriorated and thus the excellent characteristics inherent in mica are impaired. When the polymer is not incorporated in the mica layer, although mica becomes detachable rather easily, multiply-paper-making of the mica web and the heat-resistant base web is not affected, the easiness of handling the sheet and the sheet forming efficiency being the same as those in the case where the heat-resistant polymer is incorporated in the mica layer.

Examples of the types of mica flakes suitable for use in the present invention include either phlogopite or muscovite.

One type of the heat-resistant base web to be combined with the mica is that formed from the pulp-like particles of a heat-resistant polymer alone or in admixtures with heat-resistant polymer fibers and/or inorganic fibers. Another type is formed from a mixture of heat-resistant fibers and/or inorganic fibers and a binder. Suitable binders are emulsions of thermosetting or thermoplastic synthetic resins, granules of suitable size prepared by coagulating said emulsions, and polyvinyl alcohol fiber soluble in hot water. Suitable inorganic fibers are glass fiber, glass wool, ceramic fibers, rock wool fiber, slag wool, etc. Of these fibrous materials, the aforesaid heat-resistant polymers in pulp-like form or fiber form are preferably used as major component.

The multiply web formation of mica web and heat-resistant base web can be performed by means of an equipment capable of forming two or more wet webs and combining these webs into a multi-layered web. Examples of such equipments are a cylinder machine equipped with two or more cylinders, combination machine in which a cylinder machine is combined with a Fourdrinier machine, Fourdrinier machine provided with two or more slurry delivery openings, and inclined former capable of multilayer webs.

Formation of multilayered wet web is preferably performed while keeping the water content of base web above 60%. When the water content of base web becomes below 60%, strong bonding with a mica web is difficultly attained and on drying interlayer separation will sometimes take place.

The web forming is explained below in detail.

In a cylinder machine, for example, provided with two cylinders, a double-layer web can obtained in the following manner: a base web formed on the first cylinder is transferred to the felt and the felt carrying the base web is then contacted with a mica web formed on the second cylinder to laminate both webs. It is also possible to obtain the identical double-layered web by reversing the order. Another feasible procedure consists in that one of the webs is formed on the felt and, after squeezing the excess water, the other web is plied on the first web. Further, by using a cylinder machine provided with three or more cylinders, either one of the base web or mica web can be made double-layered. When a papermaking machine having two or more slices provided on a Fourdrinier wire cloth is used, a double-layer wet web can be formed by first forming a base web on the wire cloth and then feeding a mica slurry from the second slice to the wire cloth to form a mica web on the base web; the resulted double-layer wet web is then squeezed to a moisture content of 60% or more and dried to obtain a sheet in the form of satisfactorily bonded double-layer. Although the sheet thus obtained has a sufficient strength, it can be further reinforced if necessary, by disposing within the base web or between the webs synthetic or inorganic fiber strands or yarns or woven structures such as scrim which are arranged in one or more of longitudinal, crosswise and diagonal directions.

The lamination referred to in the specification and claims is caused by the hydrogen bonding within the mica layer and the heat-resistant base material layer, as well as between the two layers. The bonding occurs when the moisture of 60% or more is evaporated to dryness. The drying is preferably effected by contacting the overlaid two layers with a metal surface heated at not more than 150° C., preferably at 120° C. As the drying device, a calender or a hot press may conveniently be used.

During the drying, a pressure may be applied depending on the varnish-impregnability and structural strength desired. The pressure employed is 5 to 50 kg/cm in case of calender and 2 to 20 kg/cm$^2$ in case of hot press.

As described in the foregoing, by the method of efficient web forming, there is obtained an electric insulating sheet material distinguished for its impregnability, insulating characteristics, heat resistance, structural strength, and mica detouch.

BRIEF DESCRIPTION OF THE DRAWING

FIG. 1 shows the retention of dielectric breakdown strengths of various mica sheets.

The invention is further illustrated below with reference to Examples. The properties of insulating sheet materials shown in Examples were evaluated in the following way:

(1) Impregnability with varnish: A test piece, 2 cm in width, was vertically suspended above an epoxy varnish (viscosity: about 3 poises at 20° C.) so that one end of the test piece may touch the varnish. After 24 hours, the height at which the varnish had reached was measured. The test was conducted under the atmosphere at 20° C.

(2) Mica retention: The surface of mica layer was rubbed several times with the fingers and the detached mica particles were estimated.

(3) Interlayer adhesion: A test piece, 2 cm in width, was distorted in S-form 5 times and interlayer separation was observed.

FIG. 1 shows the retention of dielectric breakdown strengths of the mica sheets prepared in Examples 1 and 2, as well as that prepared according to the method of Japanese Patent Publication No. 20,421/68, respectively.

EXAMPLE 1

In 90 parts of N,N-dimethylacetamide containing 5 parts of LiCl, was dissolved 10 parts of poly-m-phenyleneisophthalamide having a logarithmic viscosity of 1.5 in sulfuric acid. The resulting solution was introduced into an aqueous glycerol solution in a "homomixer" operated at a high speed to obtain a pulp-like product which showed a drainage rate of 85 ml in terms of Canadian standard freeness.

On the other hand, poly-m-phenyleneisophthalamide was wet spun, drawn 2.5 fold, and heat treated. The resulting 2-denier fiber was cut to 6 mm to obtain short fiber.

(i) Forming of mica sheet

An aqueous dispersion containing 95 parts of phlogopite mica flakes and 5 parts of the above pulp-like product was prepared. By using a handsheet making apparatus of the TAPPI type, a mica sheet of a solids content of 160 g/m$^2$ was prepared from the above dispersion and transferred to a felt. This was designated as mica sheet A.

In a similar manner, a mica sheet of a solids content of 160 g/m$^2$ was prepared from an aqueous dispersion containing said mica alone and transferred to a felt. This was designated as mica sheet B.

(ii) Forming of base web

An aqueous dispersion was prepared from the following components:

|  | Parts |
|---|---|
| Pulp-like particles of heat-resistant polymer obtained above. | 60 |
| Short fiber of heat-resistant polymer | 20 |
| Glass fiber (5 μφ, 6 mm cut fiber; chopped strand CS-06D-630B supplied by Asahi Fiber Glass Co.) | 20 |

A base material sheet was prepared from the above dispersion in the same manner as in (i), transferred to a felt and drained by suction to adjust the water content to 70%. The solids content of the wet sheet was 60 g/m$^2$. This was designated as base sheet a. In a similar manner, sheet b (10 g/m$^2$ solids content and 85% water content) was obtained from the pulp-like particles of heat-resistant polymer alone; sheet c (30 g/m$^2$ solids content and 65% water content) was obtained from a dispersion of 70 parts of the same pulp-like particles and 30 parts of short fiber. Sheet d was obtained from the same composition as that for sheet a, except that rock wool was used in place of the glass fiber. The solids content and water content of sheet d were 60 g/m$^2$ and 65%, respectively.

(iii) Lamination

The base material sheet obtained in (ii) was laid over the mica sheet obtained in (i) (or vice versa), compressed by means of a press to effect drainage as well as consolidation, and then dried at 120° C. to obtain the electric insulating sheet of this invention. Physical properties of the insulating sheets thus obtained were as shown in Table 1.

TABLE 1

|  |  | No. | | | | | |
| --- | --- | --- | --- | --- | --- | --- | --- |
|  |  | 1 | 2 | 3 | 4 | 5 | 6 |
| Construction of | Mica layer | A | A | A | A | B | B |
| laminate | Base material layer | a | b | c | d | a | c |
| Basis weight (g/m²) | | 221.3 | 168.5 | 187.3 | 218.7 | 223.4 | 188.6 |
| Thickness (μ) | | 269 | 159 | 207 | 256 | 272 | 209 |
| Density (g/cm³) | | 0.82 | 1.06 | 0.96 | 0.85 | 0.82 | 0.90 |
| Tensile strength (kg/20 mm width) | | 4.7 | 1.66 | 3.1 | 4.0 | 4.6 | 3.2 |
| Elongation at rupture (%) | | 1.87 | 1.91 | 2.1 | 1.65 | 1.8 | 1.8 |
| Varnish impregnability (mm/24 hr) | | 58 | 46 | 51 | 54 | 57 | 51 |
| Mica retention | | Good* | Good | Good | Good | Fair** | Fair |
| Interlayer adhesion | | Good | Good | Good | Good | Good | Good |
| Dielectric strength (kV/mm) | | 12.3 | 22.3 | 17.3 | 12.7 | 12.5 | 17.5 |

Note:
*Good . . .None of the mica granules is detachable.
**Fair . . .Some mica granules at edges are detachable.

EXAMPLE 2

A mixture of trimellitic anhydride and 4,4'-diaminodiphenylmethane in a molar ratio of 2:1 was allowed to react. To the reaction mixture after dehydration, were added trimellitic anhydride and 4,4'-diphenylmethane diisocyanate in a molar ratio of 2:3 to obtain a polyamide-imide having a logarithmic viscosity of 0.5 in N-methyl-2-pyrrolidone. A solution of 10 parts of the polyamide-imide in 90 parts of N-methyl-2-pyrrolidone was introduced into an aqueous glycerol solution in a "homomixer" operated at a high speed to obtain a pulp-like product.

On the other hand, the polyamide-imide was wet spun, drawn 3-fold in hot water, and then heat-treated. The resulting 4-denier fiber was cut to 8 mm to obtain short fiber.

(i) Base sheet forming

An aqueous dispersion containing 60 parts of the above pulp-like product and 40 parts of the short fiber was fed to the first cylinder (first vat) of a cylinder machine with two cylinders. The wet web formed on the first cylinder was transferred to the felt and the water content was adjusted to 85%. The solids content was 60 g/m².

(ii) Mica layer forming and lamination

Then an aqueous dispersion of 95 parts of muscovite mica and 5 parts of the pulp-like product was fed to the second cylinder (second vat) to form thereon a mica layer of a solids content of 80 g/m². The mica layer was transferred to the base sheet carrying felt to overlay the base sheet. The resulting laminated web was consolidated by pressing under a linear pressure of 5 Kg/cm and dried at 120° C. to obtain the electric insulating sheet of this invention.

EXAMPLE 3

The mica sheet A of Example 1-(i) was formed on the Fourdrinier wire section of a combination Fourdrinier wire-cylinder machine, then transferred to the felt and drained by suction (100 g/m² solids content).

On the other hand, the base sheet b of Example 1-(ii) was formed on the cylinder section. In laminating the base layer over the mica layer, a glass net (Kurenet ® V-3300 of Kurashiki Spinning Co.; 25.6 g/m² in basis weight) was inserted between both layers. The resulting laminate was consolidated by pressing and then dried to obtain the glass net-reinforced electric insulating sheet of this invention.

EXAMPLE 4

A multiply web forming machine provided with three cylinders was used. Two base layers were formed on the first and second cylinders. Between the first and second cylinders, glass yarn was inserted between the two base layers at a rate of 3 yarns/cm.

A mica layer was formed on the third cylinder and laminated over the base layers. The resulting laminate was consolidated by pressing and dried to obtain the electric insulating sheet of this invention, which contained glass yarn inserted between two base layers. The composition of the base layers formed on the first and second cylinders was as follows:

|  | Parts |
| --- | --- |
| Pulp-like heat-resistant polymer obtained in Example 1 | 50 |
| Glass fiber (9 μφ, 6 mm chopped strand) | 50 |

The mica layer formed on the third cylinder was composed of 97.5 parts of phlogopite mica and 2.5 parts of the pulp-like heat resistant polymer obtained in Example 1.

The reinforcing glass yarn was low-twist strand of 200 filaments, each 6μ in diameter.

Lamination was performed after the solids contents of base sheet and mica layer had been adjusted to 35 g/m² (of which the glass yarn contributed 15 g/m²) and 45 g/cm² respectively.

EXAMPLE 5

|  | Parts |
| --- | --- |
| Short fiber obtained in Example 2 | 45 |
| Glass fiber (5 μφ; cut to 6 mm) | 50 |
| Polyvinyl alcohol fiber soluble in hot water (VPB 105-1 ® of Kuraray Co.) | 5 |

A handsheet for the base layer of the above composition was prepared and transferred to the felt and drained by suction to a water content of 60%. The solids content was 60 g/m².

A mica layer (180 g/m²) composed of 95 parts of phlogopite mica and 5 parts of the pulp-like product obtained in Example 2 was handmade and laminated over the base layer. The laminate was consolidated and dried to obtain the electric insulation sheet of this invention.

COMPARATIVE EXAMPLE 1

An electric insulating sheet was obtained in the same manner as in Example 2, except that the water content of the wet base web was adjusted to 55%.

Characteristics of the electric insulation sheets obtained in Examples 2 to 5 and Comparative Example 1 were as shown in Table 2.

TABLE 2

|  | Example 2 | Example 3 | Example 4 | Example 5 | Comp. Example 1 |
|---|---|---|---|---|---|
| Basis weight (g/m$^2$) | 142.1 | 136.3 | 83.1 | 238.2 | 140 |
| Thickness ($\mu$) | 207 | 173 | 143 | 294 | 209 |
| Density (g/cm$^3$) | 0.69 | 0.79 | 0.58 | 0.81 | 0.67 |
| Tensile strength (kg/20 mm) | 4.8 | 8.3 | 12.5 | 6.3 | 4.0 |
| Elongation at rupture (%) | 1.9 | 2.1 | 2.8 | 2.0 | 1.0 |
| Varnish impregnability (mm/24 hrs.) | 57 | 48 | 54 | 43 | 56 |
| Mica retention | Good* | Good | Good | Good | Poor |
| Interlayer adhesion | Good | Good | Good | Good | Poor |
| Dielectric strength (kV/mm) | 10.6 | 13.5 | 8.3 | 14.8 | 7.9 |

Note:
*Good: None of the mica granules is detachable.

COMPARATIVE EXAMPLE 2

A mica layer of a solids content of 160 g/m$^2$ was prepared by repeating the procedures described in (i) of Example 1, provided that in place of 95 parts of phlogopite mica and 5 parts of the pulp-like product 80 parts and 20 parts thereof were used.

With respect to the mica sheets produced in the above procedure, in (i) of Example 1 and in Example 2, respectively, their dielectric breakdown strengths at 300° C. in the laps of time were determined according to the method of JEM 1263 (1973). The changes are expressed by the retention (%) of the strength, and are shown in FIG. 1.

What is claimed is:

1. An electric insulating laminated sheet comprising:
    (i) a heat resistant wet-formed base web layer consisting essentially of pulp-like particles of an aromatic polyamide or an aromatic polyamide-imide and short fibers of said aromatic polyamide or aromatic polyamide-imide; and
    (ii) a wet-formed web layer of a mixture consisting essentially of tiny mica flakes in an amount of at least 91 parts by weight with pulp-like particles of an aromatic polyamide or an aromatic polyamide-imide in an amount of at most 9 parts by weight,
    wherein said laminated sheet is bonded together without an adhesive by hydrogen bonding within the mica layer (ii) and the heat-resistant base layer (i), as well as between the two layers.

2. A method of making an electric insulating sheet comprising the steps of:
    (a) laminating a wet-formed web consisting essentially of a mixture of mica flakes in an amount of at least 91 parts by weight with pulp-like particles of an aromatic polyamide or an aromatic polyamide-imide in an amount of at most 9 parts by weight onto a wet-formed non-woven web having a moisture content of 60% or more and consisting essentially of pulp-like particles or a mixture of pulp-like particles with short fibers of an aromatic polyamide or an aromatic polyamide-imide; and
    (b) bonding the laminated sheet of step (a) by evaporating the moisture to dryness.

3. A method according to claim 2, wherein the nonwoven web contains inorganic short fibers.

4. A method according to claim 2, wherein the bonding step (b) comprises contacting the laminate of step (a) with a metal surface heated at not more than 150° C.

* * * * *